N. B. WINN.
WEEDER AND FURROWER.
APPLICATION FILED AUG. 7, 1911.
1,023,701.
Patented Apr. 16, 1912.
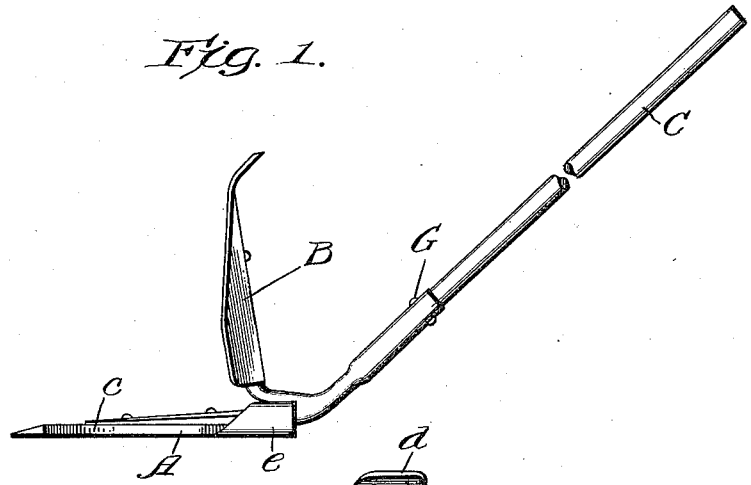
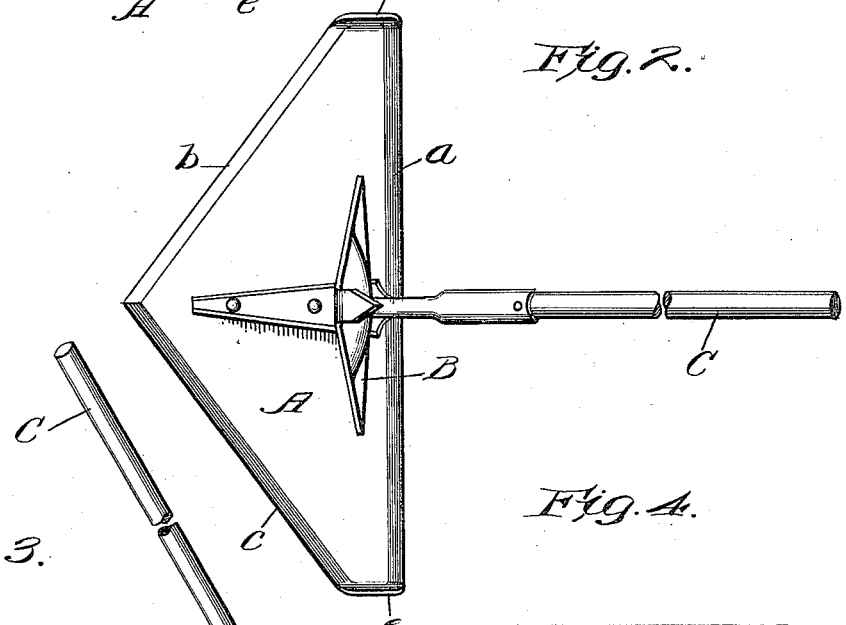
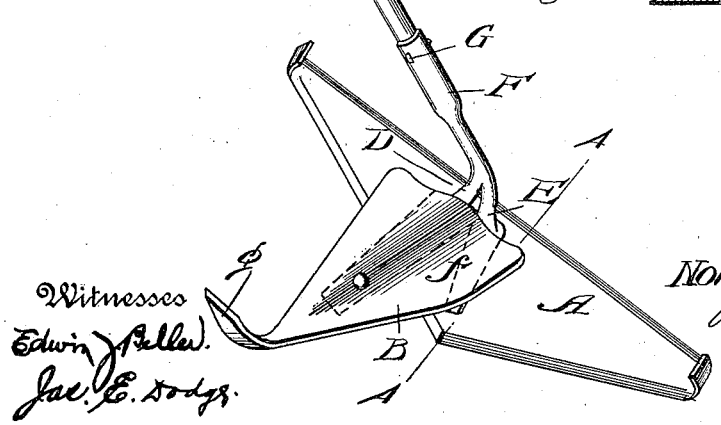
Inventor
Norman B. Winn.
Wilkinson, Fisher
& Witherspoon
his Attorneys
Witnesses
Edwin J. Beller
Jas. E. Dodge

UNITED STATES PATENT OFFICE.

NORMAN B. WINN, OF TOOELE, UTAH.

WEEDER AND FURROWER.

1,023,701.  Specification of Letters Patent.  Patented Apr. 16, 1912.

Application filed August 7, 1911. Serial No. 642,815.

*To all whom it may concern:*

Be it known that I, NORMAN B. WINN, a citizen of the United States, residing at Tooele city, in the county of Tooele and State of Utah, have invented a new and useful Combination Weeder and Furrower, of which the following is a specification.

My invention relates to hand cultivators, and has for its purpose to provide a combined garden weeder and hoe, which will be comparatively simple in use and inexpensive to manufacture.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views—Figure 1 discloses in side elevation the invention with the weeder in position for use and the furrower on the opposite side not in use; Fig. 2 is a top plan view of the parts shown in Fig. 1; Fig. 3 is a perspective view of the invention with the furrower in position for use and the weeder on the opposite side not in use; and Fig. 4 is a section view taken on the line 4—4 of Fig. 3.

A represents a weeder of triangular shape having the edges $a$, $b$, and $c$ sharpened to more easily engage the soil, while the ends $d$ and $e$ are upturned at right angles to the plane of the weeder to project above the soil when the weeder is in use and to serve as a guide in the manipulation of the weeder, and as a protection of the garden vegetation. The extreme width of this triangular weeder from its apex to the middle point of the opposite side is about one-third the length of the edge $c$.

B is a furrower having the shape of an equilateral triangle, and is convexed tapering to the tongue $g$ which is upturned at an angle approximately forty-five degrees.

A shank F, attached to the wooden handle C by bolts G, provides the members D and E, to which are fastened, by any suitable means, the weeder A and furrower B respectively. The furrower B is located intermediate of the weeder A and handle C.

From the foregoing it will be readily seen that the invention may be used as a weeder to cut the weeds and stir up the soil between the rows and around the hills of garden vegetation, by being either pushed or pulled, without cutting or disturbing the roots, stems or stocks of said garden vegetation, and by reversing the mechanism the furrower may be used for making trenches, or furrows between the rows of said garden vegetation for irrigating purposes, and to throw the soil around the roots of said vegetation as the furrow is being dug.

It is obvious that those skilled in the art may vary the details of construction and arrangement of parts without departing from the spirit of my invention, and therefore I do not wish to be limited to such features except as may be required by the claims.

What I claim is—

1. In a hand cultivator the combination of a handle; a bifurcated shank attached to said handle; a triangular member with sharpened edges and upturned ends fastened to one of the bifurcated parts, at an angle to said shank, and providing a weeder; and a second member of convex triangular shape fastened to the other of said bifurcated parts intermediate of said weeder and handle, providing a furrower, substantially as described.

2. In a hand cultivator the combination of a handle; a bifurcated shank attached to said handle; a triangular weeder with sharpened edges and upturned ends fastened to one of the bifurcated parts, at an angle to said shank; a furrower of convex triangular shape fastened to the other of said bifurcated parts intermediate of said weeder and handle; and a tongue on said furrower toward which said furrower tapers, substantially as described.

NORMAN B. WINN.

Witnesses:
  H. HEIMES,
  JAS. A. SMITH.

Copies of this patent may be obtained for five cents each, by addressing the "Commissioner of Patents, Washington, D. C."